May 31, 1960   F. SINGER   2,938,446
PHOTOGRAPHIC SHUTTER CONSTRUCTION
Filed Sept. 23, 1957
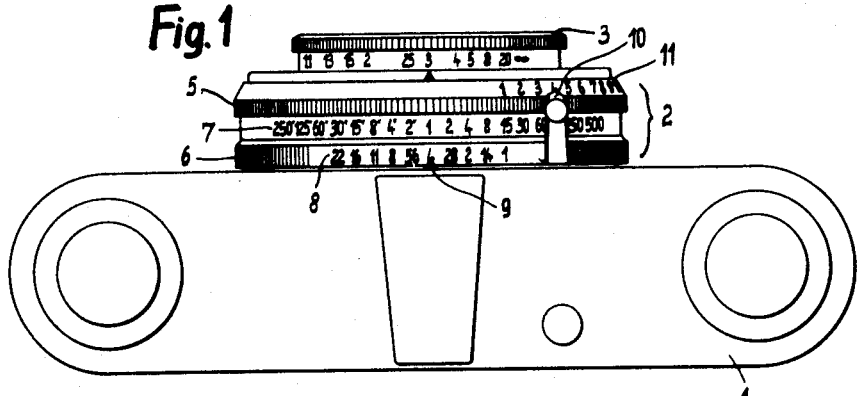
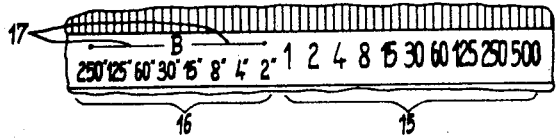
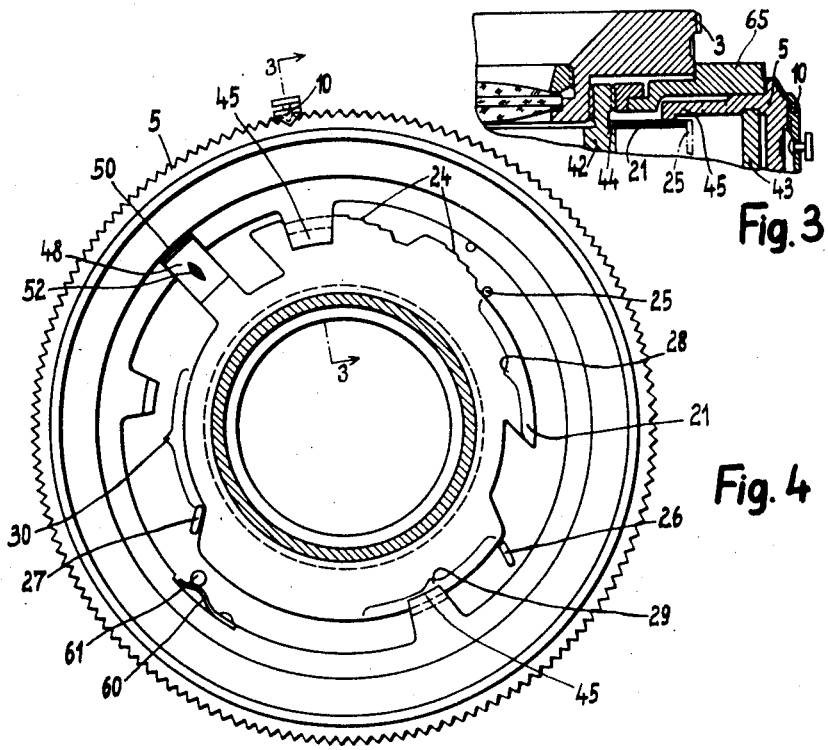

United States Patent Office 2,938,446
Patented May 31, 1960

2,938,446
PHOTOGRAPHIC SHUTTER CONSTRUCTION

Franz Singer, Munich, Germany, assignor, by mesne assignments, to Compur-Werke Friedrich Deckel OHG, Munich, Germany, a German firm Filed Sept. 23, 1957, Ser. No. 685,567

Claims priority, application Germany Sept. 28, 1956

5 Claims. (Cl. 95—64)

This invention relates to a photographic shutter of the objective type, and particularly to one in which coupling means is provided for coupling the rotary member for adjusting shutter speed to the rotary member for adjusting diaphragm aperture, so that these rotary members may be moved conjointly.

An object of the invention is the provision of a generally improved and more satisfactory shutter construction of this kind.

Another object is the provision of a shutter having an extended time scale or overtime scale, so designed and constructed that the coupling between the speed adjusting member and the aperture adjusting member need not be uncoupled when using the extended time scale, these adjusting members remaining coupled at all times whether using the extended or overtime portion of the shutter speed scale, or whether using the normal portion thereof representing shutter speeds automatically timed by the internal mechanism of the shutter.

These and other desirable objects may be attained in the manner disclosed as an illustrative embodiment of the invention in the following description and in the accompanying drawings forming a part hereof, in which:

Fig. 1 is a somewhat diagrammatic or schematic view of a camera equipped with a shutter according to a preferred embodiment of the present invention;

Fig. 2 is a view of a fragment of a shutter similar to Fig. 1, but showing a variant form of scale marking;

Fig. 3 is a fragmentary radial section through a shutter in accordance with a preferred embodiment of the invention; and Fig. 4 is a front view of the shutter with certain parts omitted and with certain overlying parts removed to show the construction beneath.

The same reference numerals throughout the several views indicate the same parts.

Referring first to Fig. 1 of the drawings, there is shown somewhat schematically a camera having a main body 1, on the front wall of which is an objective shutter indicated in general at 2, the shutter structure carrying at its front a lens mount 3 which, upon rotation about the optical axis of the shutter, serves to focus at least the front component of the lens, in order to focus accurately upon objects at various distances from the camera.

Referring now to the other views in addition to Fig. 1, the shutter structure includes the usual annular casing commonly found in objective shutters, having a stationary cylindrical outer wall 43 and an inner annular wall or flange 42 surrounding the exposure aperture of the shutter, concentrically therewith. The shutter operating mechanism is mounted, as usual, in the annular space between the walls 42 and 43.

A shutter speed adjusting ring 5 is mounted on the shutter near the forward end thereof, for rotation about the optical axis as a center, and includes an annular portion which surrounds the stationary outer wall 43 of the casing or housing, and a radial flange projecting inwardly past the front edge of the casting wall 43, for connection to the internal time adjusting or speed control cam 21 which turns with the ring 5 and controls the shutter speed in known manner. The speed adjusting ring 5 is held in place by an overlying annular cover plate 65, which is mounted in the familiar manner (by means of a nut or other retaining ring) on the front end of the tube 42.

To the rear of the shutter speed adjusting ring 5 there is a diaphragm aperture adjusting ring 6, extending circumferentially or peripherally around the shutter casing and rotatable about the optical axis as a center, for adjusting the aperture of the usual iris diaphragm leaves, in the familiar manner.

The shutter speed setting ring 5 has a circumferentially extending serrated rib, and a smooth cylindrical portion to the rear of the serrated rib, the shutter speed scale being marked on this smooth portion as indicated at 7. The diaphragm aperture setting ring 6 has a serrated rib extending circumferentially around most of the periphery, but a portion of it is smooth and carries the diaphragm aperture scale 8, preferably graduated with the usual "f" numbers. Both the shutter speed and the diaphragm aperture are read from the respective scales 7 and 8 by the same reference mark or pointer 9 suitably marked on the camera body or a fixed part of the shutter structure.

The internal parts of the shutter are so designed that both the scales 7 and 8 are logarithmic linear scales so related to each other as to be complementary. That is, the graduations are evenly spaced at constant angular distances from each other, and the values represented by successive graduations on each scale differ by a constant factor from each other, so that if the two rings 5 and 6 are turned jointly through the same amount, the shutter speed will be altered by exactly the correct amount to compensate for the change in diaphragm aperture, or vice versa. This is fully explained in the copending United States patent application of Kurt Gebele, Serial No. 389,775, filed November 2, 1953, now Patent 2,829,574, granted April 8, 1958.

Coupling means is provided for coupling the adjusting ring 5 to the adjusting ring 6 for joint turning, the coupling means in the present instance being preferably in the form of a tongue 10 secured to the ring 6 and extending forwardly, in a direction parallel to the optical axis, to engage resiliently with the serrations on the circumferential rib of the ring 5. The tongue 10 is resilient in a radial direction, but rigid in a circumferential direction, and engages with the ring 5 with sufficient force so that normally, when either one of the rings 5 and 6 is turned the other ring will turn with it. However, if one ring is firmly held and the other is turned, then the front end of the tongue 10 will slip over the ring 5 so that the two rings may be adjusted to a new position of orientation with respect to each other, particularly if the fingernail is placed under the small knob on the tongue 10 to lift it up slightly away from the rib 5.

While this resilient tongue is the preferred form of coupling means according to the present invention, it is within the scope of the present invention to couple the rings 5 and 6 to each other by any other suitable form of coupling means, e.g., the coupling means disclosed in the copending United States patent applications of Kurt Gebele, Serial No. 507,703, filed May 11, 1955, now Patent 2,887,940, granted May 26, 1959, or Serial No. 510,299, filed May 23, 1955 (now abandoned).

The forward part of the shutter speed setting ring 5 is preferably of conical shape as shown, and carries the exposure value scale 11 which, in conjunction with the pointed front end of the tongue 10 as an index mark or reference point, shows the relative positions of orientation of the two rings 5 and 6 with respect to each other, regardless of the absolute setting or value of either one of these rings.

The shutter speed scale 7 preferably is graduated not only for the shutter speeds which are capable of being automatically timed by the internal mechanism of the shutter (e.g., speeds from one second to 1/500 of a second) but also speeds for exposures of longer duration (slower speed) which cannot be timed by the internal mechanism of the shutter and which must be timed by external means, such as a watch, or by counting at an approximately uniform rate, or by other suitable external means. This portion of the scale, for exposures longer than one second, may conveniently be called the extended time scale, or the overtime scale, and extends in the opposite direction from the 1 second graduation, as plainly seen in Fig. 1, being extended to any desired maximum such as 250 seconds. Thus the numerals to the left of the numeral 1 of the scale 7, represent whole seconds, while the numerals to the right of the numeral 1 represent fractional parts of a second. To distinguish the two parts of the scale from each other so as to avoid confusion, the symbol for seconds (") may be placed adjacent each of the numerals representing full seconds, or these numerals of the overtime scale may be in a different color from the numerals of the automatically timed exposure scale. Or again, either in conjunction with or as a substitute for the different color of graduations or the use of the second symbol, the symbol "B" (standing for "bulb" exposure) may be associated with the overtime part of the scale since all of the overtime exposures are to be made in the "bulb" manner. This arrangement of scales is shown in Fig. 2, where the normal or automatically timed part of the speed scale is shown at 15, the overtime part thereof is shown at 16, and the symbol "B" is placed above the overtime part of the scale and associated with lines 17 extending in both directions from the symbol "B" to the opposite ends of the overtime scale 16.

In photographic shutters as heretofore constructed, it has been customary to provide only a single position of the shutter speed setting ring, for bulb exposures. Even when an extended time scale or overtime scale has been provided on the shutter, to assist the operator in calculating the duration of exposures which are to be timed manually, it has been necessary, after reading the exposure duration from the overtime scale, to move the shutter speed adjusting member away from the setting which gives the overtime value, in order to set it at the "B" position. When using a shutter having coupling means for coupling the diaphragm adjusting member to the shutter speed adjusting member, it has thus been necessary, after setting these members to ascertain a desired exposure time for a desired aperture setting, to uncouple the members from each other and move the shutter speed setting member to the "B" position, while leaving the diaphragm aperture setting member in its proper adjusted position. This has required an extra operation, and has destroyed the visual continuity of the indication of the exposure duration, and has destroyed the advantages of coupling in enabling the operator to see instantly the required duration of exposure for any particular diaphragm aperture setting.

According to the present invention, the internal mechanism of the shutter is constructed so that the shutter is set for a manually timed "B" or "bulb" exposure, through a considerable range of angular movement of the time or speed adjusting ring 5, instead of being set for "B" exposure only at a definite single position of the speed adjusting ring, as has been the case in previous shutters. The range of positions in which the shutter is set for "B" exposure corresponds to the range of the extended time scale or overtime scale, so that when the speed ring 5 is set with any of the overtime scale graduations opposite the index 9, the shutter will in all cases operate with a manually timed or "B" exposure.

To accomplish this, the control cam 21 of the shutter has the usual cam surfaces for controlling the automatically timed exposures in the usual way, and in addition, the surfaces which control the "B" exposure are extended concentrically to the optical axis, through the necessary range to accomplish the purpose above mentioned.

For example, referring to Fig. 4, the cam surfaces 24 control the position of the pin 25 on the adjustable gear segment of the clockwork timing or delaying mechanism within the shutter, during the automatically timed exposures, in known manner. For a bulb exposure, the pin 25 should be held in the position shown in Fig. 4, and the surface 28 which holds the pin 25 in this position is extended circumferentially, concentric with the optical axis, so that through a considerable range the pin 25 is held in the same position necessary for a bulb exposure. Likewise, the lug 26, which represents a lug on the escapement member or vibrating anchor of the clockwork gear train, is supposed to have the position shown in Fig. 4 when the shutter is set for a bulb exposure, and the cam 21 has a concentric surface 29 extended a considerable distance in the circumferential direction, for holding this lug 26 in the required position, throughout the entire range of overtime scale settings.

The member 27 represents the control lug on the bulb control lever of the shutter. It should have the position shown in Fig. 4 when the shutter is set for bulb exposure, and should be moved farther out radially away from the center when the shutter is set for one of the automatically timed exposures. It is seen from the shape of the cam 21 that when this cam is turned clockwise from the position shown in Fig. 4, to set the shutter for one of the automatically timed exposures, the lug 27 is cammed radially outwardly as required. But as the cam 21 turns counterclockwise, the next step beyond the one second exposure setting allows the lug 27 to move radially inwardly to the position shown in Fig. 4, to set the bulb operating lever in proper position. It will also be noted that the surface 30 is extended circumferentially through a considerable range, so that the bulb lever lug 27 is held in this same position as the cam 21 turns further in a counterclockwise direction toward any of the other positions of the extended time scale or overtime scale.

The internal construction of the shutter may vary to a considerable extent without departing from the present invention, many forms of shutter operating mechanism being well known, and those skilled in the art will readily understand from the preceding description that in any case, regardless of the exact location or spacing of the control members, the cam is to be shaped to hold the control members in the appropriate "B" setting positions, for any of the overtime scale setting positions of the external control ring. Merely as a convenient example of possible constructions, reference is made to United States Patent 1,687,123, granted October 9, 1928 for an invention of Deckel and Geiger. The location and orientation of the various parts shown in Fig. 4 is a little different from the location and orientation of the corresponding parts in said Deckel and Geiger patent, but the gear segment pin 25 in Fig. 4 of the present application may correspond in function to the gear segment pin 46 in said Deckel and Geiger patent, and the escapement anchor lug 26 in the present application may correspond in function to the escapement anchor lug 56 in said Deckel and Geiger patent, the bulb lever lug 27 in the present application may correspond in general to the lug 116 in said Deckel and Geiger patent. Of course the shape of the cam 21 of the present shutter may be altered as required to cooperate with various control pins and control lugs of various known types of shutters, such alteration being readily accomplished by anyone skilled in the photographic shutter art, when the principles of the present invention are clearly understood.

As already indicated, the cam ring 21 in the present invention is preferably formed as a separate member from the shutter speed setting ring 5, rather than being integral with the shutter speed setting ring as was the case with the corresponding parts in said Deckel and Geiger patent. The construction of the cam ring as a separate member enables it to be made of relatively thin metal which can be easily stamped out to the required accuracy on a punch press, without requiring subsequent machining operations. The cam ring or disk 21 preferably rotates on a shoulder 44 formed externally near the forward end of the tube 42, and is held fast against this shoulder by two lugs 45 formed on the speed setting ring 5 and extending radially inwardly to a position overlapping the edge of the cam disk 21, as seen in Figs. 3 and 4.

The cam disk furthermore has an approximately radial arm 48, the end of which engages reasonably tightly in a groove 50 formed in the speed setting ring 5, to couple the cam disk 21 permanently to the setting ring 5 for rotation therewith without any play. The arm 48 has a protuberance 52 which engages preferably in notches formed on the inner face of the overlying cover plate 65, in a resilient manner, to hold the assembly in any position of orientation to which it is set, against accidental displacement. There is one such notch for each of the adjusted positions of the speed setting ring.

In order to call the operator's attention forcibly to the fact that the speed adjusting ring 5 is being turned from the automatically timed exposure range to the manually timed or overtime scale range, the ring 5 preferably carries a small leaf spring 60 bent so as to press against a fixed pin 61 within the casing, as the ring 5 is turned from the one second position to the two second position, or vice versa. Thus when adjusting the ring, the operator can easily turn it from the automatically timed range to the extended or overtime range, as desired, but he will feel the momentary resistance caused by the spring 60 engaging the pin 61, to direct his attention to the fact that he has shifted from one range to the other.

It is also possible to use a movable stop for engaging a part on the ring 5, to prevent the turning thereof to any position on the overtime scale until the stop has first been moved aside. Such a stop can be constructed, for example, in a manner similar to the stop 96 which impedes part of the setting motion of the shutter tensioning lever 6 in said Deckel and Geiger patent, making it necessary to move such stop aside when it is desired to give an additional movement to the setting lever in order to produce a pre-timing operation of the shutter.

With the arrangement as described and illustrated, it is seen that the coupling between the shutter speed ring 5 and the diaphragm aperture ring 6 need not be uncoupled when the shutter is set to a low exposure value and it is necessary to use a manually timed exposure in order to employ a diaphragm aperture of a small size which may be desired. If, for example, the shutter is set for an exposure value of 4 (as illustrated in Fig. 1) it is seen that the operator may use an automatically timed exposure of one second with a diaphragm of $f{:}4$, or an automatically timed exposure of ¼ second for example, with a diaphragm aperture of $f{:}2$, but if he wishes to take the picture with a diaphragm aperture of $f{:}5.6$ or smaller, then he must use a manually timed exposure. In the past, even when an extended time scale has been provided, it has been necessary to make a mental note of the required length of exposure for a particular diaphragm aperture, and then uncouple the shutter speed ring from the diaphragm aperture ring and turn the shutter speed ring back to the "B" position. But this is not necessary with the present invention, for the coupling may remain effective while the rings 5 and 6 are turned together to any selected pair of speed settings and aperture settings, and the shutter mechanism will be set for "B" exposure while the required time for manual timing of the exposure is still shown in the proper place on the scale 7. Thus the operator does not run the risk of forgetting the proper time of exposure after setting the parts ready for exposure.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter construction including a housing, a shutter speed adjusting ring rotatable on said housing, a diaphragm aperture adjusting ring also rotatable on said housing, means for releasably coupling said two rings to each other for conjoint rotation in any one of a series of positions of relative orientation with respect to each other, an index mark in fixed position relative to said housing, a shutter speed scale on said speed adjusting ring, said speed scale being movable past said index mark as said speed adjusting ring is turned and having a first series of graduations indicating shutter speeds which may be automatically timed by the shutter mechanism and a second series of graduations indicating shutter speeds of extended times which must be timed manually, a control part within said housing movable between a first position to condition said shutter for an automatically timed exposure and a second position to condition said shutter for a manually timed exposure, and cam means operatively connected to and rotating with said speed adjusting ring for positioning said control part in its said first position when any graduation of said first series is opposite said index mark and in its said second position when any graduation of said second series is opposite said index mark, said control part remaining in said second position during a manually timed exposure.

2. A construction as defined in claim 1, further including resilient detent means for producing appreciable resistance to turning said speed adjusting ring from a position in which a graduation of one series is opposite said index mark to a position in which a graduation of the other series is opposite said index mark.

3. A photographic shutter construction including a housing, a shutter speed adjusting ring rotatable on said housing, a diaphragm aperture adjusting ring also rotatable on said housing, means for releasably coupling said two rings to each other for conjoint rotation in any one of a series of positions of relative orientation with respect to each other, an index mark in fixed position relative to said housing, a shutter speed scale on said speed adjusting ring, said speed scale being movable past said index mark as said speed adjusting ring is turned and having a first series of graduations indicating shutter speeds which may be automatically timed by the shutter mechanism and a second series of graduations indicating shutter speeds of extended times which must be timed manually, and "bulb" exposure control means within said housing, characterized by means operated by said speed adjusting ring for holding said "bulb" exposure control means in position to produce a manually timed "bulb" exposure during the entire range of rotary movement of said speed adjusting ring to move any of said second series of graduations to a position opposite said index mark.

4. A construction as defined in claim 3, further including a diaphragm aperture scale on said aperture adjusting ring, said aperture scale and said speed scale being in circumferentially overlapping relation to each other and both being read in conjunction with the same index mark.

5. A construction as defined in claim 3, further including a diaphragm aperture scale on said aperture adjusting ring, said aperture scale and said speed scale being in circumferentially overlapping relation to each other and both being read in conjunction with the same index mark, and an exposure value scale on one of said rings and a cooperating reference mark on the other of said rings for indicating the relative position of orientation in which said rings are set with respect to each other at any given time, the graduations of said second series of graduations of said speed scale lying opposite respective graduations of said aperture scale serving to indicate the duration of a manually timed exposure which should be used when employing a diaphragm aperture of the respectively indicated size, so that when any selected graduation of said second series is brought opposite said index mark, a manually timed exposure may then be made without uncoupling said two rings from each other and without resetting said speed adjusting ring to a different position.

References Cited in the file of this patent

UNITED STATES PATENTS

| | | |
|---|---|---|
| 1,623,998 | Cooke | Apr. 12, 1927 |
| 1,687,123 | Deckel et al. | Oct. 9, 1928 |
| 2,596,328 | Dorsey | May 13, 1952 |

FOREIGN PATENTS

| | | |
|---|---|---|
| 310,855 | Switzerland | Nov. 15, 1955 |

UNITED STATES PATENT OFFICE

CERTIFICATE OF CORRECTION

Patent No. 2,938,446  May 31, 1960

Franz Singer

It is hereby certified that error appears in the above numbered patent requiring correction and that the said Letters Patent should read as corrected below.

In the grant, lines 2 and 12, and in the heading to the printed specification, line 4, name of assignee, for "Compur-Werke Friedrich Deckel OHG" read -- Compur-Werk Friedrich Deckel OHG --.

Signed and sealed this 1st day of November 1960.

(SEAL)
Attest:

KARL H. AXLINE
Attesting Officer

ROBERT C. WATSON
Commissioner of Patents